United States Patent
Payne et al.

(10) Patent No.: US 6,932,466 B2
(45) Date of Patent: Aug. 23, 2005

(54) INK-JET PRINTING PROCESS

(75) Inventors: John David Payne, Manchester (GB); Kevin Johnson, Preston (GB); Mark Holbrook, Manchester (GB); Mark Kenworthy, Manchester (GB); Stephen George Yeates, Manchester (GB); Tom Annable, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 10/433,566

(22) PCT Filed: Dec. 6, 2001

(86) PCT No.: PCT/GB01/05393

§ 371 (c)(1),
(2), (4) Date: Oct. 15, 2003

(87) PCT Pub. No.: WO02/45971

PCT Pub. Date: Jun. 13, 2002

(65) Prior Publication Data

US 2004/0046848 A1 Mar. 11, 2004

(30) Foreign Application Priority Data

Dec. 7, 2000 (GB) ............................................. 0029821
Jan. 15, 2001 (GB) ............................................. 0101008

(51) Int. Cl.$^7$ ................................................. B41J 2/01
(52) U.S. Cl. .......................... 347/100; 347/96; 523/160
(58) Field of Search ........................... 347/100, 95, 96, 347/101, 105; 523/160; 428/704; 106/31.6, 31.13, 31.27

(56) References Cited

U.S. PATENT DOCUMENTS

| | | | |
|---|---|---|---|
| 4,904,507 A | 2/1990 | Greenwood | 428/29 |
| 5,104,730 A | 4/1992 | Misuda et al. | 428/304.4 |
| 5,576,088 A | 11/1996 | Ogawa et al. | 428/327 |
| 5,589,269 A | 12/1996 | Ali et al. | 428/411.1 |
| 5,747,148 A | 5/1998 | Warner et al. | 428/212 |
| 5,985,076 A | 11/1999 | Misuda et al. | 156/230 |
| 6,158,856 A | 12/2000 | Sato et al. | 347/101 |
| 6,197,880 B1 | 3/2001 | Nigam | 524/845 |

FOREIGN PATENT DOCUMENTS

| | | | | |
|---|---|---|---|---|
| EP | 0 696 516 A1 | 2/1996 | | |
| EP | 0 705 710 A1 | 4/1996 | | |
| EP | 0 830 952 A2 | 3/1998 | | |
| EP | 1 172 224 A1 | 1/2002 | | |
| JP | 57064591 | 4/1982 | | |
| JP | 9254529 | 9/1997 | | |
| JP | 2000290562 | 10/2000 | | |
| WO | WO 94/20305 | 9/1994 | | |
| WO | WO 98/19857 | 5/1998 | | |
| WO | WO 99/54144 | 10/1999 | | |
| WO | WO 99/54541 | * 10/1999 | | D06P/1/52 |
| WO | 00/37258 | 6/2000 | | |
| WO | WO 00/37258 | * 6/2000 | | B41M/5/00 |
| WO | 00/58107 | 10/2000 | | |
| WO | WO 00/58107 | * 10/2000 | | B41M/5/00 |

* cited by examiner

Primary Examiner—Manish S. Shah
(74) Attorney, Agent, or Firm—Morgan, Lewis & Bockius LLP

(57) ABSTRACT

An ink-jet printing process including the steps (a) and (b) in any order or simultaneously:

(a) applying an ink to a substrate by means of an ink-jet printer in a localized manner to form an image on the substrate; and (b) applying to the substrate a composition including a liquid medium and a poly($C_{3-18}$-hydrocarbyl monoguanidine) or a salt thereof by means of an ink-jet printer. also a substrate printed by means of this process, compositions including poly($C_{3-18}$-hydrocarbyl monoguanidines), sets of liquids for use in ink-jet printing and ink-jet printer cartridges.

The process avoids the need for expensive special papers previously used for ink jet printing.

20 Claims, No Drawings

INK-JET PRINTING PROCESS

The present invention relates to ink-jet printing processes, to fixing compositions, to sets of liquids and to ink-jet printer cartridges.

Ink jet printing (IJP) is a non-impact printing technique in which droplets of ink are ejected through a fine nozzle onto a substrate without bringing the nozzle into contact with the substrate. The images prepared by IJP desirably meet many demanding requirements. For example, they should be sharp and non-feathered and should also exhibit high water-fastness, light-fastness, humidity-fastness and optical density. Furthermore the recording sheets printed with the images are preferred to dry quickly so that sheets printed shortly afterwards do not smudge the image. Compositions used in IJP should have good jettability (i.e. low tendency to block the fine nozzles used in ink-jet printers).

European Patent Application EP0291214 A2 describes an information device in the form of a substrate which carries concealed information which becomes detectable by suitably treating the substrate, e.g. by washing. The device could use a number of agents to fix the concealed information, including polyhexamethylene biguanide ("PHMB") having a repeat unit of the formula —$(CH_2)_6$—HNC(=NH)NH—C(=NH)NH—.

International Patent Application WO0037258 describes an ink-jet printing method comprising ink-jet printing an ink containing a colorant onto a substrate which is treated with PHMB either before, after or during ink-jet printing. The PHMB is said to provide prints with increased water fastness.

The use of compositions comprising polymono guanides (PMG's) in ink-jet printing processes is described in International Patent Application WO00/58107. PMG's are distinguished from PHMB by the fact that they contain mono guanidine groups whereas PHMB contains biguanide groups of formula —NHC=(NH)NHC(=NH)NH—. In WO00/58107 compositions comprising PMG were applied to the entire substrate (i.e. not in a localized manner) by various coating, spraying or ink-jet printing methods.

The cost of using special substrates (e.g. treated paper) for ink-jet can be significant for small businesses and home users. Ideally these businesses and users would like to use ordinary substrates (e.g. plain paper etc) since this is far cheaper than special substrates. On the other hand, ordinary substrates usually do not have the desirable properties of special substrates. Thus the performance of, for example, plain paper can be unacceptable. There is a need for a process for printing which avoids the expense of using special substrates while at the same time giving better results than conventional ink-jet printing on ordinary substrates such as plain paper.

According to a first aspect of the present invention there is provided an ink-jet printing process comprising the steps (a) and (b) in any order or simultaneously:

(a) applying an. ink to a substrate by means of an ink-jet printer in a localized manner to form an image on the substrate; and (b) applying to the substrate a composition comprising a liquid medium and a poly($C_{3-18}$-hydrocarbyl monoguanidine) or a salt thereof by means of an ink-jet printer.

By applying the composition of step (b) by means of an ink-jet printer one may use ordinary media (e.g. plain paper) as the substrate, avoiding the need for expensive special substrates. Furthermore, application of the composition by means of the ink-jet printer can avoid the waste of poly($C_{3-18}$-hydrocarbyl monoguanidine) because the compound can be selectively applied to the localized areas referred to in step (a). A still further advantage arising from the ability to selectively apply the poly($C_{3-18}$-hydrocarbyl monoguanidine) in a localized manner is that undesirable stains such as dirt, tea, coffee are not attracted to or fixed onto unprinted areas.

In step (b), therefore it is preferred that the composition is applied to the substrate in a localized manner and the areas where the ink and composition are applied in steps (a) and (b) are substantially coextensive. For example, the areas printed with the ink and the areas printed with the composition overlap by at least 80%, more preferably at least 90%, especially at least 95%, more especially at least 98%.

The PMG preferably comprises a plurality of groups of Formula (1) and/or groups of Formula (2) or salts thereof:

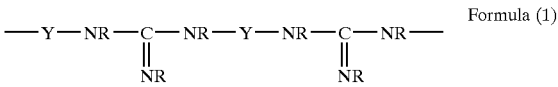

Formula (1)

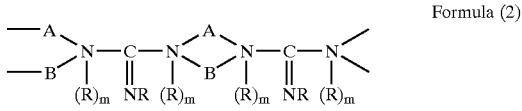

Formula (2)

wherein:
each m independently is 0 or 1;
each Y independently is a $C_{2-18}$-hydrocarbyl group;
A and B are hydrocarbyl groups which together comprise a total of 3 to 18 carbon atoms; and
each R independently is hydrogen, optionally substituted alkyl or optionally substituted alkoxy.

Preferably m is 0.

The hydrocarbyl groups in the PMG and represented by Y, A and B are optionally interrupted by one or more hetero atoms or groups and optionally carry one or more substituents other than hydrogen. Preferred interrupting atoms and groups are —O—, —S—, —NH—, —C(=O)— and phenylene. Preferred optional substituents are hydroxy; $C_{1-4}$-alkoxy; halo, especially chloro or bromo; nitro; amino; substituted amino; and acid groups, especially carboxy, sulpho phosphato, guanidino and substituted guanidino.

When the hydrocarbyl group represented by Y, A or B is an alkylene group it is preferably straight chain or branched chain.

Preferably the hydrocarbyl groups in the PMG and represented by Y are $C_{3-18}$-alkylene (more preferably $C_{4-16}$-alkylene, especially $C_{6-12}$-alkylene, more especially $C_6$-alkylene); $C_{3-12}$-arylene more preferably $C_{6-10}$-arylene, especially phenylene or naphthylene; $C_{7-12}$-arakylene (more preferably $C_{7-11}$-arylene, especially benzylene or xylene); or a combination thereof, optionally interrupted by one or more —O—, —S—, —NH— or —C(=O)— groups:

Preferably the hydrocarbyl groups represented by A and B are each independently $C_{2-6}$-alkylene, optionally interrupted by one or more —O—, —S—, —NH— or —C(=O)— groups, with the proviso that A and B each comprise a total of 3 to 18 carbon atoms, preferably 3 to 6 carbon atoms, more preferably 3 or 4 carbon atoms, and with the proviso that A and B together comprise a total of 3 to 18 carbon atoms. In an especially preferred embodiment one of A or B is —$CH_2$— or —$(CH_2)_2$— and the other is —$(CH_2)_2$—, more especially both A and B are —$(CH_2)_2$—

Examples of preferred -hydrocarbyl groups represented by Y include —$CH_2C_6H_4CH_2$—, —$CH_2OC_6H_4OCH_2$—, —$CH_2OC_6H_{10}OCH_2$—, —$(CH_2)_3O(CH_2)_3$— and —$(CH_2)_2S(CH_2)_2$—.

Examples of particularly preferred -hydrocarbyl groups represented by Y include —(CH$_2$)$_8$—, —(CH$_2$)$_8$—, —(CH$_2$)$_9$—, —(CH$_2$)$_{12}$—, —CH$_2$CH(—CH$_3$)(CH$_2$)$_4$CH$_3$, 1,4-, 2,3- and 1,3-butylene, 2,5-hexylene, 2,7-heptylene, 3-methyl-1,6-hexylene.

It is preferred that all groups represented by Y are the same and are C$_{4-16}$-alkylene, more preferably C$_{4-12}$-alkylene, especially C$_{4-8}$-alkylene more especially 1,6-hexylene.

Preferably each R independently is H, C$_{1-4}$-alkyl, C$_{1-4}$-alkoxy or C$_{1-4}$-alkoxy-OH, more preferably H or methyl, especially H.

Preferably the PMG consists essentially of groups of Formula (1) as hereinbefore defined.

Preferably all groups represented by R are the same.

More preferably all groups represented by R are H.

The nature of the terminating groups on the PMG is not believed to be critical. Preferred terminating groups on the PMG are amino and guanidinino.

In view of the foregoing preferences the poly(C$_{3-12}$-hydrocarbyl monoguanidine) preferably comprises one or more groups of Formula (3) or salts thereof:

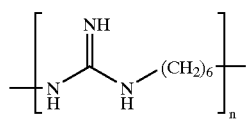

Formula (3)

wherein:

n is 2 to 100, preferably 2 to 50, especially 3 to 25.

Preferably, the PMG is in the form of a salt. Preferred salts are those with organic or inorganic acids, especially water-soluble salts, for example the gluconate, acetate or phosphate salt.

The PMGs may be prepared by the reaction of guanidine hydrochloride with a diamine, for example of the formula H$_2$N—Y—NH$_2$ or HN(-A-) (-B-)NH, or with a mixture of such diamines, wherein Y, A and B are as hereinbefore defined.

It is to be understood that the PMG may also contain repeating units other than repeat units of Formula (1) and (2). In PMG's containing biguanide groups in addition to the monoguanidine groups it is preferred that the number of biguanide groups is less than 70%, more preferably less than 60%, and in one embodiment less than 10%, in each case relative to the total number of biguanide and monoguanidine groups in the PMG. However, it is preferred that the PMG consists essentially of or consists of repeat units of Formula (1) and/or (2).

The PMG is preferably colourless or substantially colourless.

The composition used in step (b) preferably further comprises a binder. The binder is preferably a polymeric or polymerisable binder, more preferably a water-soluble or water-dissipatable polymeric or polymerisable binder or a hydrophobic binder. Preferred water-soluble polymeric and polymerisable binders include starches, preferably hydroxy alkyl starches, for example hydroxyethylstarch; celluloses, for example celluslose, methylcellulose, hydroxyethylcellulose, hydroxypropylcellulose, hydroxyethyl methyl cellulose, carboxymethlycellulose (and salts thereof) and cellulose acetate; butyrate; gelatin; gums, for example guar, xanthan gum and gum arabic; polyvinylalcohol; polyvinylphosphate; polyvinylpyrrolidone; polyvinylpyrrolidine; polyethylene glycol; hydrolysed polyvinylacetate; polyethylene imine; polyacrylamides, for example polyacrylamide and poly(N,N-dimethyl acrylamide) and polyacrylamido-2-methyl propane sulphonic acid); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly(vinyl pyrrolidonedialkylaminoalkyl alkylacrylates), for example poly vinylpyrrolidone-diethylaminomethylmethacrylate; acid-functional acrylic polymers and copolymers, for example poly(meth)acrylic acid and copolymers of (meth)acrylic acid and other (meth)acrylate monomers; amine-functional acrylic polymers and copolymers, for example polydimethylaminoethylmethacrylate; acid or amine functional urethane polymers, preferably those containing dimethylolpropanoic acid and/or pendant or terminal polyethylene glycols; ionic polymers, especially cationic polymers, for example poly (N,N-dimethyl-3,5-dimethylene piperidinium chloride);polyesters, preferably those which carry water-solubilising groups, especially sulphonic acid groups, for example polyesters obtainable by polymerising a polyol with sodiosulphoisophthalic acid.

The water-soluble binders are preferred over water-dissipatable binders due to their fast dry times and lower tendency to block the fine jets used in ink-jet printers. A combination of water-soluble binders and water-dissipatable binders can also be beneficial in terms of improved mechanical strength, reduced tendency for sheets to stick together and good ink absorbency.

Preferred water-dissipatable polymeric or polymerisable binders are: latex polymers, for example cationic, non-ionic and anionic styrene-butadiene latexes; vinyl acetate-acrylic copolymer latexes; acrylic copolymer latexes which carry quaternary ammonium groups, for example containing copolymerised dimethylaminoethyl (meth)acrylate; and dispersions of polyester, polyurethane, (meth)acrylate or vinyl polymers and copolymers thereof.

The polymer dispersions are preferably prepared by emulsion polymerisation or by dispersion into water of polymers prepared by suspension, bulk or solution polymerisation.

The binder may comprise a single binder or a mixture of two or more binders, especially the preferred binders mentioned above.

Overall particularly good results are found when the binder comprises methylcellulose (to give good mechanical properties), polyvinylpyrrolidone, polyvinylalcohol, polyacrylic acid (to give good ink absorbency) or a combination thereof to give the combined benefits mentioned above.

When a binder is used in the composition used in step (b) the weight ratio of the binder to the PMG is preferably from 99:1 to 1:99, more preferably from 60:40 to 15:85, especially from 50:50 to 20:80 and more especially from 30:70 to 20:80.

The composition used in step (b) may also contain further ingredients if desired, for example catalysts (e.g. to accelerate cross-linking of the binder), polymeric fillers (e.g. polymethylmethacrylate particles of 10 to 50 μm diameter), anti-kogation additives, cross-linkers, primers, drying-time accelerants, adhesion promoters, defoamers, surfactants, cationic or anionic salts (e.g. an inorganic acid or organic acid salt of an optionally substituted polyethyleneimine), whiteners and/or inorganic minerals (e.g. to entrap ink, such as silicates and aluminates) and combinations thereof, to name but a few.

The composition may also contain a cross-linker, preferably in an amount which causes from 0.1 to 5%, more preferably 0.15 to 4%, especially 0.2 to 2% crosslinking of the crosslinkable components of the composition. These levels of crosslinking are preferred because they can result in enhanced mechanical strength without adversely affecting ink absorbing properties.

Suitable crosslinkers include salts of divalent and trivalent metals (e.g. calcium and magnesium acetate). These metals also offer the advantage of improving water-fastness of resultant prints.

The PMG and binder are preferably dispersed or more preferably dissolved in the liquid medium. The liquid medium is preferably selected from water; organic solvent; and a mixture of water and one or more water-soluble organic solvent(s).

Preferably step (b) of the process is performed before step (a) or simultaneously with step (a).

The composition is preferably applied to the substrate in step (b) such that the concentration of PMG on the substrate is up to 20 g.m$^{-2}$, more preferably up to 5 g.m$^{-2}$, especially from 0.1 to 2 g.m$^{-2}$, and more especially from 0.5 to 1 g.m$^{-2}$.

The ink-jet printer used in step (b) is preferably the same as that used to apply the ink to the substrate in step (a). The composition of step (b) is preferably applied to the substrate just prior to, or simultaneously with, application of the ink in step (a). Preferably the ink-jet printer used to apply the ink and composition of step (b) has a nozzle or a series of nozzles in the printer which are dedicated to the application of the composition of step (b). Thus the printer may be of the 'five pen' type in which yellow, magenta, cyan and black are applied by four pens and the composition is applied by a fifth pen. A suitable ink-jet printer and a method for its control is described in EP 657 849.

It is to be understood that in all embodiments of the present invention the terms "ink", "colorant", "PMG" and "binder" extend to two or more of these materials as well as one of them.

A preferred composition suitable for application to the substrate in step (b) by means of an ink-jet printer comprises:
(a) from 0.1 to 10 parts of a PMG;
(b) from 0 to 10 parts of a binder, more preferably 0.1 to 9 parts of binder;
(c) from 30 to 60 parts of a water-soluble organic solvent; and
(d) from 35 to 80 parts water;
wherein all parts are by weight and the total number of parts (a)+(b)+(c)+(d)=100.

This composition forms a further feature of the present invention.

Preferred water-soluble organic solvents are selected from the list below in relation to liquid media for inks.

The composition preferably has a viscosity of less than 20 cP at 25° C.

Preferably the composition is transparent or colourless when dry.

The ink used in step (a) of the process preferably comprises a liquid medium and a colorant. Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-soluble organic solvent or a mixture of such solvents. Preferred water-soluble organic solvents include $C_{1-8}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-soluble ethers, preferably tetrahydrofuran and dioxane; diols, preferably diols having from 2 to 12,carbon atoms, for example pentane-1,5-diol, ethylene glycol, propylene glycol, butylene, glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy) ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50° to 125° C. The organic solvent may be water-immiscible, water-soluble or a mixture of such solvents. Preferred water-soluble organic solvents are any of the hereinbefore described water-soluble organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

Any colorant suitable for inkjet printing may be used in the ink. Preferred colorants are pigments which may be organic (including carbon black) or inorganic, disperse dyes and water-soluble dyes, more preferably water-soluble azo dyes.

The colorant preferably has one or more groups for imparting or assisting water-solubility/dispersibtility. Examples of such groups include —COOH, —SO$_3$H, —PO$_3$H$_2$, morpholinyl and, piperazinyl and salts thereof.

When the colorant is a pigment the ink preferably also contains a suitable dispersant to give a stable dispersion of the pigment in the ink. Preferably the particle size of the pigment used in the ink is less than 1 μm.

The ink may contain a single colorant or comprise a mixture of two or more colorants.

The colorant is preferably present in the ink at a concentration of 0.5 to 20 parts, more preferably from 1 to 15 parts and especially from 1 to 5 parts by weight based upon the weight of the ink.

The ink may also contain additional components conventionally used in ink-jet printing inks, for example viscosity and surface tension modifiers, corrosion inhibitors, additives to prevent paper curl, biocides, kogation reducing additives, dispersants and surfactants which may be ionic or non-ionic.

In a first preferred embodiment of the present invention the colorant has at least two groups selected from —COOH, —PO$_3$H$_2$, morpholinyl and piperazinyl or salts thereof. More preferably the colorant has at least two groups selected from —COOH and —PO$_3$H$_2$ or salts thereof.

It is especially preferred that the colorant is a water-soluble dye which has at least two groups selected from —COOH, —PO$_3$H$_2$ morpholinyl and piperazinyl, or salts thereof. Preferred examples of such dyes include the dyes of the Formulae (4) to (9) and salts thereof, especially sodium, lithium and ammonium salts:

Formula (4)

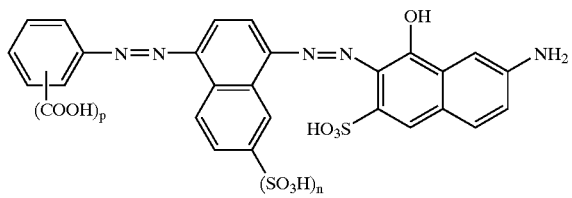

wherein:

n is 0 or 1; and p is 2;

Formula (5)

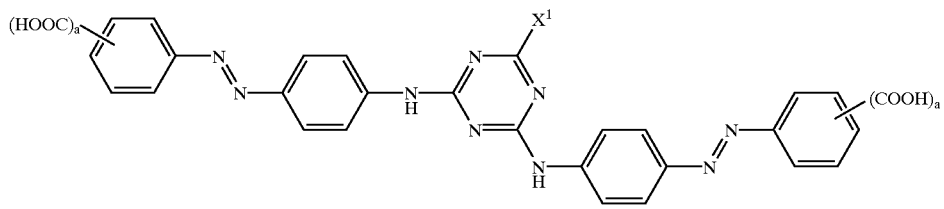

wherein:

X$^1$ is morpholinyl, piperazinyl or —NHR$^1$;

R$^1$ is optionally substituted alkyl (preferably optionally substituted C$_{1-8}$alkyl); and each a=2;

Formula (6)

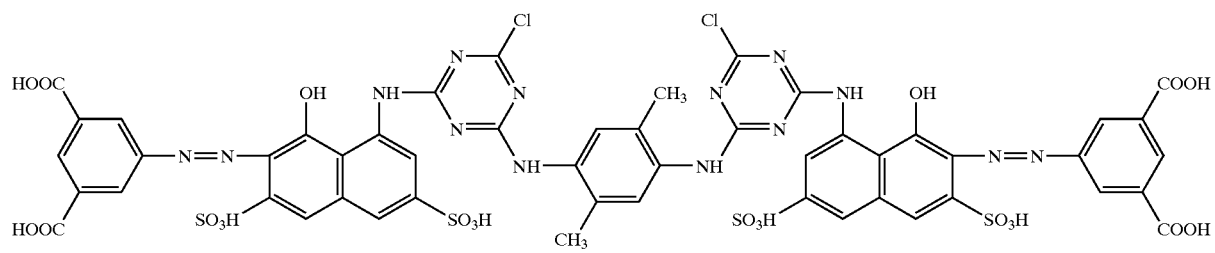

Formula (7)

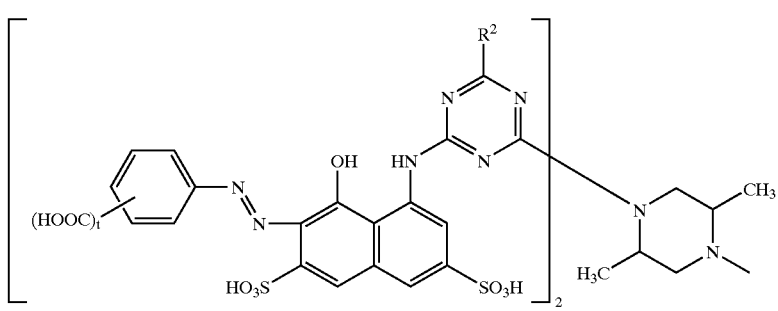

wherein:
each $R^2$ independently is alkoxy, —Cl, —OH or amino; and
each t=2;

Formula (8)

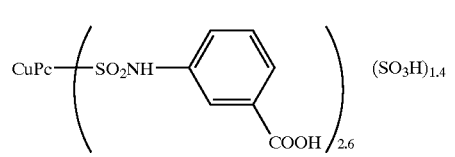

wherein CuPc is a copper phthalocyanine nucleus.

Formula (9)

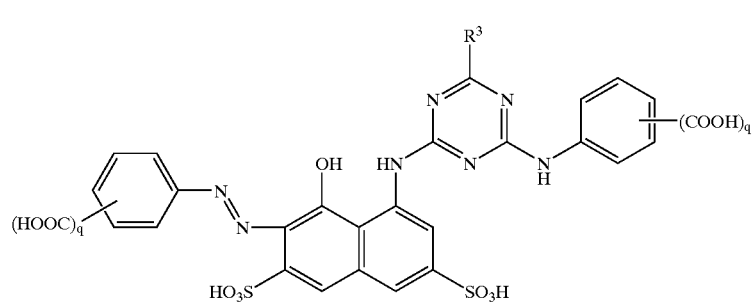

wherein:
$R^3$ is —OH, —Cl, or $C_{1-4}$-alkoxy; and
each q is 2.

In the dyes of Formulae (4), (5), (7) and (9) the —COOH is preferably meta to the azo group (—N=N—).

The compounds of Formula (4) may be prepared using methods analogous to those described in the art for similar disazo compounds. For example, as described in Examples 1 and 2 of EP 356 080.

The dyes of Formula (5) may be prepared using an analogous process to that described in Examples 10 and 15 of EP 468 647A.

The dye of Formula (6) may be prepared using a method analogous to Example 1 of EP 468 648, wherein in place of phenylenediamine there is used 2,5-dimethyl-1,4-phenylene diamine.

The dyes of Formula (7) may be prepared using a method analogous to that described in Example 3 of EP 679 173 B1.

The dyes of Formula (8) may be prepared using a method analogous to that described in Example 3 of EP 559 309 A2.

The dyes of Formula (9) may be prepared using conventional techniques, for example, using the method described on pages 17 and 18 and Example 1 of EP 0 628 088.

Preferred pigments which have at least two groups selected from —COOH, —$PO_3H_2$ morpholinyl and piperazinyl, or salts thereof include derivatives of pigments from the azo, disazo, condensed azo, thioindigo, indanthrone, isoindanthrone, anthanthrone, anthraquinone, isodibenzanthrone, triphendioxazine, quinacridone and phthalocyanine series of pigments.

Preferred carbon black pigments in this first preferred embodiment comprise carbon black particles onto which are attached organic groups which carry one or more groups selected from —COOH, —$PO_3H_2$ morpholinyl and piperazinyl, or salts thereof. Examples of such carbon black pigments are disclosed in U.S. Pat. No. 5,803,959 and U.S. Pat. No. 5,630,868.

We have found that when inks which contain a colorant with at least two groups selected from —COOH, —$PO_3H_2$, morpholinyl and piperazinyl, or salts thereof are used in step (a) of the present process, the resulting prints exhibit a reduction in colour-to-colour bleed and a high light-fastness compared to prints prepared without the PMG used in of step (b).

In view of the forgoing preferences a particularly preferred ink comprises:
(a) from 0.5 to 20 parts of a water-soluble dye containing at least two groups selected from —COOH, —$PO_3H_2$, morpholinyl and piperazinyl;
(b) from 50 to 98 parts water; and
(c) from 2 to 50 parts of water-soluble organic solvent(s):
wherein all parts are by weight and the sum of the parts (a)+(b)+(c)=100.

Preferably the ink contains less than 500 ppm, more preferably less than 250 ppm, especially less than 100 pm, more especially less than 10 ppm in total of divalent and trivalent metal ions: (other than any divalent and trivalent metal ions bound to a component of the ink). The content of halide ions in the ink is preferably below 500 ppm ('ppm' means parts per million by weight relative to the total weight of ink).

Preferably the ink has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

The reasons for the localized regions referred to in steps (a) and (b) being substantially coextensive are because if the ink is applied to a significantly larger area than the fixer then some of the print will not benefit from improved fixation, leading to smearing and lower wet-fastness. On the other hand, if the fixer is applied to a significantly larger area than the ink (e.g. to the entire substrate) this is wasteful because the fixer is not needed in some of the areas to which it has been applied and it can lead to unwanted fixation of dirt from a users hand and spilled beverages such as tea and coffee, resulting in excessive staining of printed substrates.

The inkjet printer preferably applies the ink and composition comprising the PMG to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. In WO 00/48938 and WO 00/55089 a new form of piezoelectric technology is described where ink is ejected from an ink ejection nozzle chamber utilizing an electromechanical actuator connected to a paddle or plunger which moves towards the ejection nozzle of the chamber for the ejection of drops of ink from the ejection nozzle chamber.

The substrate is preferably paper, plastic, textile, metal or glass, more preferably paper, textile or a plastic film (especially a transparent film, for example an overhead projector slide). It is especially preferred that the substrate is paper (particularly coated paper, more particularly a lightweight coated offset type paper), textile or a transparent film.

Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

Preferred plastic films are transparent polymeric films, especially those suitable for use as overhead projector slides, for example polyesters (especially polyethylene terephthalate), polycarbonates, polyimides, polystyrenes, polyether sulphones, cellulose diacetate and cellulose triacetate films.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

The prints obtained using the process also exhibit low colour bleed, high print quality and, in some cases, higher light-fastness compared to prints prepared without the PMG.

Furthermore, the application of the PMG does not markedly affect the shade or hue of the ink and does not result in the discoloration of the printed substrate.

According to a second aspect of the present invention there is provided a substrate printed with an image by means of the process according to the first aspect of the invention. The preferred substrates are as hereinbefore defined in relation to the first aspect of the present invention.

Preferably the image is colour image comprising at least two colours, more preferably a colour image derived from a digital camera or a scanner. For example the image may be derived from a file in the .jpg, .jpeg, .tif, .tiff, .pcx, .psp, .pdf, .acc, .fdf, .art, .bmp, .dcx, .fpx, .gif, .mic, .mix, .png, .xws, .pbm, .pgm, .ppm, .pnm, .tga, .xif or .xbm file format.

According to a third aspect of the present invention there is provided a fixing composition comprising a poly($C_{3-18}$-hydrocarbyl monoguanidine), a liquid medium and optionally a binder, wherein the poly($C_{3-18}$-hydrocarbyl monoguanidine) is as defined in the first aspect of the invention. Preferred binders and liquid media are as hereinbefore described in relation to the first aspect of the present invention. The fixingcomposition must be suitable for use in an ink-jet printer. Thus this fixing composition is as described above as being suitable for application to the substrate by means of an ink-jet printer. More preferably the composition has a viscosity of less than 20 cP, more preferably less than 10 cP, especially less than 5 cP, at 25° C. These low viscosity fixing compositions are particularly well suited for application to substrates by means of ink-jet printers having demanding criteria for the liquids they apply.

Preferably the fixing composition contains less than 500 ppm, more preferably less than 250 ppm, especially less than 100 pm, more especially less than 10 ppm in total of divalent and trivalent metal ions (other than any divalent and trivalent metal ions bound to a component of the fixing composition).

Preferably the fixing composition has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Thus a particularly preferred fixing composition is one which comprises a poly($C_{3-18}$-hydrocarbyl monoguanidine) and contains less than 500 ppm divalent and trivalent metal ions (other than any divalent and trivalent metal ions bound to a component of the fixing composition) and which has been filtered through a filter having a mean pore size below 10 μm.

According to a fourth aspect of the present invention there is provided a set of liquids suitable for use in an ink-jet printer comprising:
(a) a first liquid comprising:
 (i) 0.01 to 50 parts, more preferably 0.1 to 30 and especially from 0.1 to 10 parts of a poly($C_{3-18}$-hydrocarbyl monoguanidine) as defined in the first aspect of the invention;
 (ii) 50 to 99.8, more preferably 60 to 80 parts of a liquid medium selected from water, one or more water-soluble organic solvents and a mixture of water and, one or more water-soluble organic solvents; and
 (iii) 0 to 50, preferably 0 to 40, more preferably from 0 to 10 parts and especially from 0.1 to 10 of a binder;
wherein all parts are by weight and the total number of parts (i)+(ii)+(iii)=100; and
(b) a second liquid which is an ink comprising a colorant and a liquid medium.

The ink in the set of liquids according to the fourth aspect of the present invention preferably comprises:
  (i) from 0.5 to 20 parts of a colorant (preferably a water-soluble dye) containing at least two groups selected from —COOH, —PO$_3$H$_2$, morpholine and piperazine;
  (ii) from 50 to 98 parts water; and
  (iii) from 2 to 50 parts of water-soluble organic solvent(s); wherein all parts are by weight and the sum of the parts (i)+(ii)+(iii)=100.

The preferred PMGs, colorants, water-soluble organic solvents and binders are as hereinbefore defined in the first aspect of the present invention.

The set according to the fourth aspect of the present invention is preferably housed in an ink-jet printer, i.e. the invention also provides an ink-jet printer comprising a printing mechanism and a set of liquids wherein the set of liquids is as defined in the fifth aspect of the present invention. The set of liquids may be contained in one or more than one cartridge present in an ink-jet printer.

The invention also provides an ink-jet printer cartridge comprising a plurality of chambers and a set of liquids, wherein the liquids are contained in individual chambers of the ink-jet printer cartridge and the set of liquids is as defined in the fifth aspect of the invention.

The invention also provides an ink-jet printer cartridge comprising a plurality of chambers and a composition, wherein the composition is contained in a chamber of the ink-jet printer cartridge and the composition is as defined in the fourth aspect of the invention.

The invention is further illustrated by the following examples in which all parts and percentages are by weight unless specified otherwise.

EXAMPLE 1

Stage 1—Preparation of Monoguanidines
(a) Preparation of Poly(hexamethyleneguanidine).HCl ("PMG 1")

Guanidine hydrochloride (45 g) and 1,6-hexamethylenediamine (54.74 g) were weighed into a 250 ml round-bottomed flask. The mixture was heated to 120° C. with stirring under N$_2$. The reaction mixture was held under N$_2$ at 120° C. for 5 hours. The temperature was then increased to 150° C. and the reaction mixture was held at this temperature for a further 7 hours. The reaction mixture containing the product was allowed to cool to room temperature and then mixed with an equal volume of distilled water and heated to 80° C. and held at this temperature until the product had dissolved. The solution was cooled and the pH adjusted to 1.5 with concentrated HCl and adjusted to 25% solids with distilled water. The aqueous solution of the product separated from an oily top layer using a separating funnel.

The resultant monoguanidine was of Formula (3) as hereinbefore defined wherein n had an average value of 5 as determined by $^1$H NMR end group analysis.

(b) Preparation of Poly(nonamethylenequanidine).HCl ("PMG 2")

The procedure was carried out as for PMG 1 above except that an equimolar mixture of 1,9-nonamethylenediamine and guanidine hydrochloride was used in place of 1,6-hexamethylenediaime.

(c) Preparation of Poly(dodecamethyleneganidine).HCl ("PMG 3")

The procedure was carried out as for PMG 1 above except that an equimolar mixture of 1,12-dodecamethylenediamine and guanidine hydrochloride was used in place of 1,6-hexamethylenediamine.

(d) Preparation of Poly(hexamethyleneguanidine) Acetate ("PMG 15")

A solution of poly(hexamethyleneguanidine).HCl (20% solution in water, 100 g) was mixed with sodium hydroxide (30%, 100 g). The resultant precipitate was isolated and washed repeatedly with 5% sodium hydroxide and then with distilled water to yield the free base. An aqueous solution of the acetate salt was formed by adding water to the free base followed by a 15% aqueous solutions of acetic acid until the pH reached a value of 7.

(e) Preparation of Poly(hexamethylenequanidine).phosphate ("PMG 8")

The procedure was carried out as for PMG 15 above except that 15% phosphoric acid was used in place of acetic acid.

(f) Preparation of Poly(hexamethyleneguanidine) .propionate ("PMG 22")

The procedure was carried out as for PMG 15 above except that 15% propionic acid was used in place of acetic acid.

Stage 2—Preparation of Inks

An ink was prepared as shown in Table A:

TABLE A

|  | Ink A |
|---|---|
| PROJET ™ Fast Magenta 2 from Avecia | 3% |
| 2-pyrrolidone | 9% |
| diethylene glycol | 9% |
| cyclohexanol | 2% |
| water | 77% |
| pH adjusted with sodium hydroxide to 9.0: | |

Stage 3—Preparation of Fixing Compositions

The following composition containing PMG 1 and a comparative example using PHMB (a biguanide) and a binder were prepared as shown in Table B wherein all parts are by weight:

TABLE B

|  | Comparative Example A (parts) | Example 1 (parts) |
|---|---|---|
| PHMB.HCl | 5 | |
| PMG 1 | | 5 |
| 2-pyrrolidone | 9 | 9 |
| diethylene glycol | 9 | 9 |
| cyclohexanol | 2 | 2 |
| water | 75 | 75 |
| pH adjusted with nitric acid to: | 4 | 4 |

Polyhexamethylene biguanide hydrochloride used was a 20% solution in water from Avecia Ltd as Vantocil®™ IB.

Stage 4—Ink-jet Printing

The compositions shown in Table B (Comparative Example A and Example 1) were in separate experiments placed into one chamber and Ink A was put into another chamber of a trichamber Olivetti JP192 standard 3 colour thermal ink-jet printer. The ink and compositions were printed onto Spectratech Lustrolaser paper in the form of parallel bars with the compositions being applied immediately prior to Ink A. In control experiments the compositions were omitted.

The water fastness of the resultant prints was evaluated as described below.

Stage 5—Water-fastness Assessment

The paper printed with the inks in the form of parallel bars was attached to a support at a 45° angle so that the parallel bars were in a horizontal direction. A pipette was then used to dispense 0.5 ml of distilled water (pH 6–7) onto the print at a position slightly above the top of the parallel bars, taking care to ensure the run down of water over the print was as close as possible to a right angle to the printed bars.

After allowing the print to dry the extent of dye transfer from the printed to unprinted areas was expressed by measuring the reflected optical density of the stained area between lines 4 to 6 and taking the average value.

It was found that prints which had been fixed with the PMG 1 showed better water-fastness than those fixed with PHMB (Comparative Example A) and had significantly better water-fastness than those prints which were not treated with PMG1.

By applying PMG 1 and the ink to substantially co-extensive areas of the substrate the fastness of the prints was increased without wasting PMG, without having to use expensive special paper and without risking PMG attracting stains to unprinted areas.

EXAMPLES 2 to 97

Stage (a)—Preparation of Monoguanides

Monoguanides were prepared by the general method of Example 1, Stage 1(a) ("PMG" 1) except that in place of 1,6-hexamethylenediamine there was used the linking amine shown in Table C below in an equimolar amount. where the salt form was other than HCl the HCl salts were converted to the corresponding acetate, phosphate and propionate salts using the general methods described in Example 1, Stage 1(d), 1(e) and 1(f) respectively.

TABLE C

| Monoguanide | Further Monoguanides<br>Linking Amine | Salt Form |
|---|---|---|
| PMG 4 | $C_6:C_{12}$ (1:1) | HCl |
| PMG 5 | —N(CH$_2$CH$_2$)$_2$N—:C$_6$ (1:1) | HCl |
| PMG 6 | —N(CH$_2$CH$_2$)$_2$N—:C$_{12}$ (1:1) | HCl |
| PMG 7 | Jeffamine ® T403:C$_6$ (1:1) | HCl |
| PMG 9 | C$_9$ | phosphate |
| PMG 10 | C$_{12}$ | phosphate |
| PMG 11 | C$_6$:C$_{12}$ (1:1) | phosphate |
| PMG 12 | —N(CH$_2$CH$_2$)$_2$N—:C$_6$ (1:1) | phosphate |
| PMG 13 | —N(CH$_2$CH$_2$)$_2$N—:C$_{12}$ (1:1) | phosphate |
| PMG 14 | Jeffamine ® T403:C$_6$ (1:1) | phosphate |
| PMG 16 | C$_9$ | acetate |
| PMG 17 | C$_{12}$ | acetate |
| PMG 18 | C$_6$:C$_{12}$ (1:1) | acetate |
| PMG 19 | —N(CH$_2$CH$_2$)$_2$N—:C$_6$ (1:1) | acetate |
| PMG 20 | —N(CH$_2$CH$_2$)$_2$N—:C$_{12}$ (1:1) | acetate |
| PMG 21 | Jeffamine ® T403:C$_6$ (1:1) | acetate |
| PMG 23 | C$_9$ | propionate |
| PMG 24 | C$_{12}$ | propionate |
| PMG 25 | C$_6$:C$_{12}$ (1:1) | propionate |
| PMG 26 | —N(CH$_2$CH$_2$)$_2$N—:C$_6$ (1:1) | propionate |

TABLE C-continued

| Monoguanide | Further Monoguanides<br>Linking Amine | Salt Form |
|---|---|---|
| PMG 27 | —N(CH$_2$CH$_2$)$_2$N—:C$_{12}$ (1:1) | propionate |
| PMG 28 | Jeffamine ® T403:C$_6$ (1:1) | propionate |

PMG 1, 2, 3, 15, 8 and 22 were prepared as described in Example 1.
Jeffamine ® T403 is a triamine sold by Huntsman Corporation (CAS 39423-51-3).
$C_6$ is 1,6-hexamethylenediamine
$C_9$ is 1,9-nonamethylenediamine
$C_{12}$ is of 1,12-dodecamethylenediamine
1:1 refers to a 1:1 mixture by weight.

Stage (b) Prepartion of Compositions

Further compositions according to the invention may be obtained by preparing the known inks described in Table D, column 2 but omitting the colorant and any anionic surfactant and including the PMG's shown in Table C in the formulation. In column 3 of Table D the PMG and amount used (shown in brackets; parts by weight relative to 100 parts by weight of the composition) is shown.

TABLE D

| Example | Known Ink | PMG (parts) |
|---|---|---|
| | EP 940 455 A1 | |
| 2 | Example 1 | PMG 1 (2.0) |
| 3 | Example 2 | PMG 2 (1.6) |
| 4 | Example 3 | PMG 3 (0.5) |
| 5 | Example 4 | PMG 4 (5.0) |
| 6 | Example 5 | PMG 5 (1.8) |
| 7 | Example 6 | PMG 6 (0.75) |
| 8 | Example 7 | PMG 7 (4.0) |
| | EP 769 536 B1 | |
| 9 | Example 1 | PMG 8 (10.0) |
| 10 | Example 2 | PMG 9 (6.2) |
| 11 | Example 3 | PMG 10 (3.4) |
| 12 | Example 4 | PMG 11 (5.6) |
| 13 | Example 5 | PMG 12 (2.8) |
| | U.S. Pat. No. 5,788,754 | |
| 14 | Example 1 | PMG 13 (3.9) |
| 15 | Example 2 | PMG 14 (5.0) |
| 16 | Example 3 | PMG 15 (6.0) |
| 17 | Example 4 | PMG 16 (8.0) |
| | EP 314 485 | |
| 18 | Example 1 | PMG 17 (5.0) |
| 19 | Example 2 | PMG 18 (4.0) |
| 20 | Example 3 | PMG 19 (3.5) |
| 21 | Example 4 | PMG 20 (2.0) |
| 22 | Example 5 | PMG 21 (6.5) |
| 23 | Example 6 | PMG 22 (9.0) |
| 24 | Example 7 | PMG 23 (10.0) |
| 25 | Example 8 | PMG 24 (1.0) |
| | U.S. Pat. No. 5,183,502 | |
| 26 | Example 1 | PMG 25 (3.5) |
| 27 | Example 2 | PMG 26 (4.6) |
| 28 | Example 3 | PMG 27 (5.2) |
| 29 | Example 4 | PMG 28 (1.8) |
| 30 | Example 5 | PMG 1 (2.9) |
| 31 | Example 6 | PMG 2 (5.4) |
| 32 | Example 7 | PMG 3 (6.8) |
| 33 | Example 8 | PMG 4 (3.1) |
| 34 | Example 9 | PMG 5 (0.6) |
| | EP 649 888 A | |
| 35 | Example A1 | PMG 6 (0.5) |
| 36 | Example A2 | PMG 7 (0.9) |

TABLE D-continued

| Example | Known Ink | PMG (parts) |
|---|---|---|
| 37 | Example A3 | PMG 8 (2.0) |
| 38 | Example A4 | PMG 9 (3.0) |
| 39 | Example A5 | PMG 10 (4.0) |
| 40 | Example A6 | PMG 11 (5.0) |
| 41 | Example A7 | PMG 12 (6.0) |
| 42 | Example A8 | PMG 13 (1.5) |
| 43 | Example B1 | PMG 14 (3.4) |
| 44 | Example B2 | PMG 15 (2.8) |
| 45 | Example B3 | PMG 16 (4.1) |
| 46 | Example B4 | PMG 17 (6.2) |
| 47 | Example B5 | PMG 18 (5.2) |
| 48 | Example B6 | PMG 19 (3.8) |
| 49 | Example B7 | PMG 20 (7.2) |
| 50 | Example B8 | PMG 21 (0.7) |
| 51 | Example C1 | PMG 22 (10.1) |
| 52 | Example C2 | PMG 23 (8.6) |
| 53 | Example C3 | PMG 24 (9.4) |
| 54 | Example C4 | PMG 25 (6.2) |
| 55 | Example C5 | PMG 26 (5.8) |
| 56 | Example C6 | PMG 27 (3.9) |
| 57 | Example C7 | PMG 28 (2.0) |
| 58 | Example C8 | PMG 1 (7.5) |
| 59 | Example D1 | PMG 2 (6.5) |
| 60 | Example D2 | PMG 3 (5.5) |
| 61 | Example D3 | PMG 4 (4.3) |
| 62 | Example D4 | PMG 5 (2.9) |
| 63 | Example D5 | PMG 6 (1.8) |
| 64 | Example D6 | PMG 7 (3.0) |
| 65 | Example D7 | PMG 8 (5.6) |
| 66 | Example D8 | PMG 9 (3.8) |
| 67 | Example E1 | PMG 10 (2.9) |
| 68 | Example E2 | PMG 11 (3.5) |
| 69 | Example E3 | PMG 12 (4.6) |
| 70 | Example E4 | PMG 13 (3.2) |
| 71 | Example E5 | PMG 14 (5.0) |
| 72 | Example E6 | PMG 15 (2.5) |
| 73 | Example E7 | PMG 16 (1.25) |
| 74 | Example E8 | PMG 17 (6.0) |
| | EP 823 929 | |
| 75 | Example 1 | PMG 18 (2.8) |
| 76 | Example 2 | PMG 19 (4.0) |
| 77 | Example 3 | PMG 20 (5.0) |
| 78 | Example 4 | PMG 21 (6.0) |
| 79 | Example 5 | PMG 22 (7.0) |
| 80 | Example 6 | PMG 23 (8.0) |
| 81 | Example 7 | PMG 24 (9.0) |
| 82 | Example 8 | PMG 25 (10.0) |
| 83 | Example 9 | PMG 26 (1.0) |
| 84 | Example 10 | PMG 27 (2.0) |
| 85 | Example 11 | PMG 28 (3.0) |
| 86 | Example 12 | PMG 1 (5.5) |
| 87 | Example 13 | PMG 2 (5.5) |
| 88 | Example 14 | PMG 3 (5.5) |
| 89 | Example 15 | PMG 4 (3.0) |
| 90 | Example 16 | PMG 5 (3.0) |
| 91 | Example 17 | PMG 6 (3.0) |
| 92 | Example 18 | PMG 7 (2.0) |
| 93 | Example 19 | PMG 8 (4.0) |
| 94 | Example 20 | PMG 9 (4.0) |
| 95 | Example 21 | PMG 10 (4.0) |
| 96 | Example 22 | PMG 11 (4.0) |
| 97 | Example 23 | PMG 12 (4.0) |

EXAMPLE 98

The ink-jet printing method of Example 1, stage 4, may be repeated except that in place of the composition used in Example 1 there is used the compositions of Examples 2 to 97 respectively.

What is claimed is:

1. An ink-jet printing process comprising the steps (a) and (b) in any order or simultaneously:
    (a) applying an ink to a substrate by means of an ink-jet printer in a localised manner to form an image on the substrate; and
    (b) applying to the substrate a composition comprising a liquid medium and a poly($C_{3-18}$-hydrocarbyl monoguanidine) or a salt thereof by means of an ink-jet printer.

2. A process according to claim 1 wherein the composition is applied to the substrate in a localised manner and the areas where the ink and the composition are applied in steps (a) and (b) are substantially coextensive.

3. A process according to any one of the preceding claims wherein the poly($C_{3-18}$-hydrocarbyl monoguanidine) comprises a plurality of groups of Formula (1) and/or groups of Formula (2) or salts thereof:

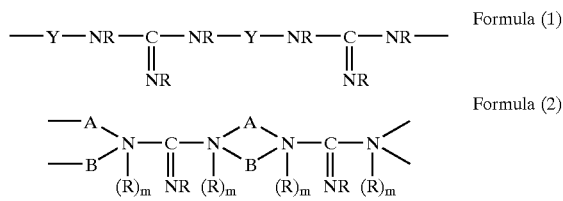

wherein:
    each m independently is 0 or 1;
    each Y independently is a $C_{2-18}$-hydrocarbyl group;
    A and B are hydrocarbyl groups which together comprise a total of 3 to 18 carbon atoms; and
    each R independently is hydrogen, optionally substituted alkyl or optionally substituted alkoxy.

4. A process according to claim 1 or 2 wherein the poly($C_{3-12}$-hydrocarbyl monoguanidine) comprises one or more groups of Formula (3) or salts thereof:

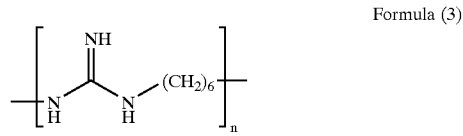

wherein:
    n is 2 to 50.

5. A process according to claim 1 or 2 wherein the composition used in step (b) further comprises a binder.

6. A process according to claim 1 or 2 wherein the composition used in step (b) contains a crosslinker.

7. A process according to claim 1 or 2 wherein step (b) of the process is performed before step (a) or simultaneously with step (a).

8. A process according to claim 1 or 2 wherein the ink contains less than 500 ppm in total of divalent and trivalent metal ions (other than any divalent and trivalent metal ions bound to a component of the ink).

9. A process according to claim 1 or 2 wherein the ink of step (a) comprises a liquid medium and a colorant with at least two groups selected from —COOH, —$PO_3H_2$, morpholinyl and piperazinyl or salts thereof.

10. A substrate printed with an image by means of the process according to claim 1 or 2.

11. A fixing composition for use in an ink-jet printer comprising a poly($C_{3-18}$-hydrocarbyl monoguanidine), a liquid medium and a binder, wherein the liquid medium comprises an organic solvent.

12. A fixing composition according to claim 11 which contains less than 500 ppm divalent and trivalent metal ions (other than any divalent and trivalent metal ions bound to a component of the fixing composition) and which has been filtered through a filter having a mean pore size below 10 μm.

13. A fixing composition according to either claim 11 or 12 which has a viscosity of less than 20 cP at 25° C.

14. An ink-jet printer cartridge comprising a plurality of chambers and a fixing composition, wherein the fixing composition is contained in a chamber of the ink-jet printer cartridge and the fixing composition is as defined in claim 11 or 12.

15. A fixing composition according to claim 11 wherein the poly($C_{3-18}$-hydrocarbyl monoguanidine) comprises a plurality of groups of Formula (1) and/or groups of Formula (2) or salts thereof:

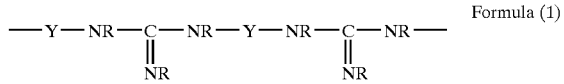
Formula (1)

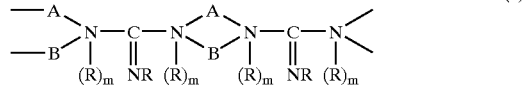
Formula (2)

wherein:

each m independently is 0 or 1;

each Y independently is a $C_{2-18}$-hydrocarbyl group;

A and B are hydrocarbyl groups which together comprise a total of 3 to 18 carbon atoms; and each R independently is hydrogen, optionally substituted alkyl or optionally substituted alkoxy.

16. A fixing composition according to claim 11 wherein the poly($C_{3-18}$-hydrocarbyl monoguanidine) comprises one or more groups of Formula (3) or salts thereof:

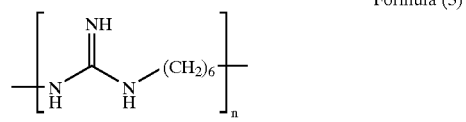
Formula (3)

wherein:

n is 2 to 50.

17. A set of liquids suitable for use in an ink-jet printer comprising:

(a) a first liquid comprising:
(i) 0.01 to 50 parts of a poly($C_{3-18}$-hydrocarbyl monoguanidine);
(ii) 50 to 99.8 of a liquid medium selected from water, one or more water-soluble organic solvents and a mixture of water and one or more water-soluble organic solvents; and
(iii) 0 to 50 parts of a binder;

wherein the parts are by weight and the total number of parts (i)+(ii)+(iii)=100; and (b) an ink comprising a colorant and a liquid medium.

18. An ink-jet printer cartridge comprising a plurality of chambers and a set of liquids, wherein the liquids are contained in individual chambers of the ink-jet printer cartridge and the set of liquids is as defined in claim 17.

19. A set of liquids according to claim 17 wherein the poly($C_{3-18}$-hydrocarbyl monoguanidine) comprises a plurality of groups of Formula (1) and/or groups of Formula (2) or salts thereof:

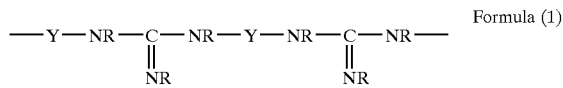
Formula (1)

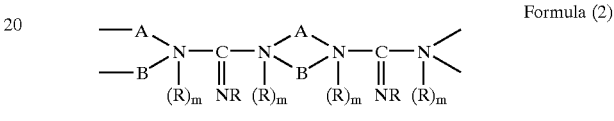
Formula (2)

wherein:

each m independently is 0 or 1;

each Y independently is a $C_{2-18}$-hydrocarbyl group;

A and B are hydrocarbyl groups which together comprise a total of 3 to 18 carbon atoms; and each R independently is hydrogen, optionally substituted alkyl or optionally substituted alkoxy.

20. A set of liquids according to claim 17 wherein the poly($C_{3-18}$-hydrocarbyl monoguanidine) comprises one or more groups of Formula (3) or salts thereof:

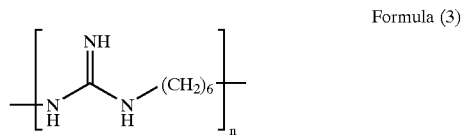
Formula (3)

wherein:

n is 2 to 50.

* * * * *